A. F. POOLE.
AEROPLANE SPEED INDICATOR.
APPLICATION FILED JULY 8, 1918.
1,387,555.
Patented Aug. 16, 1921.
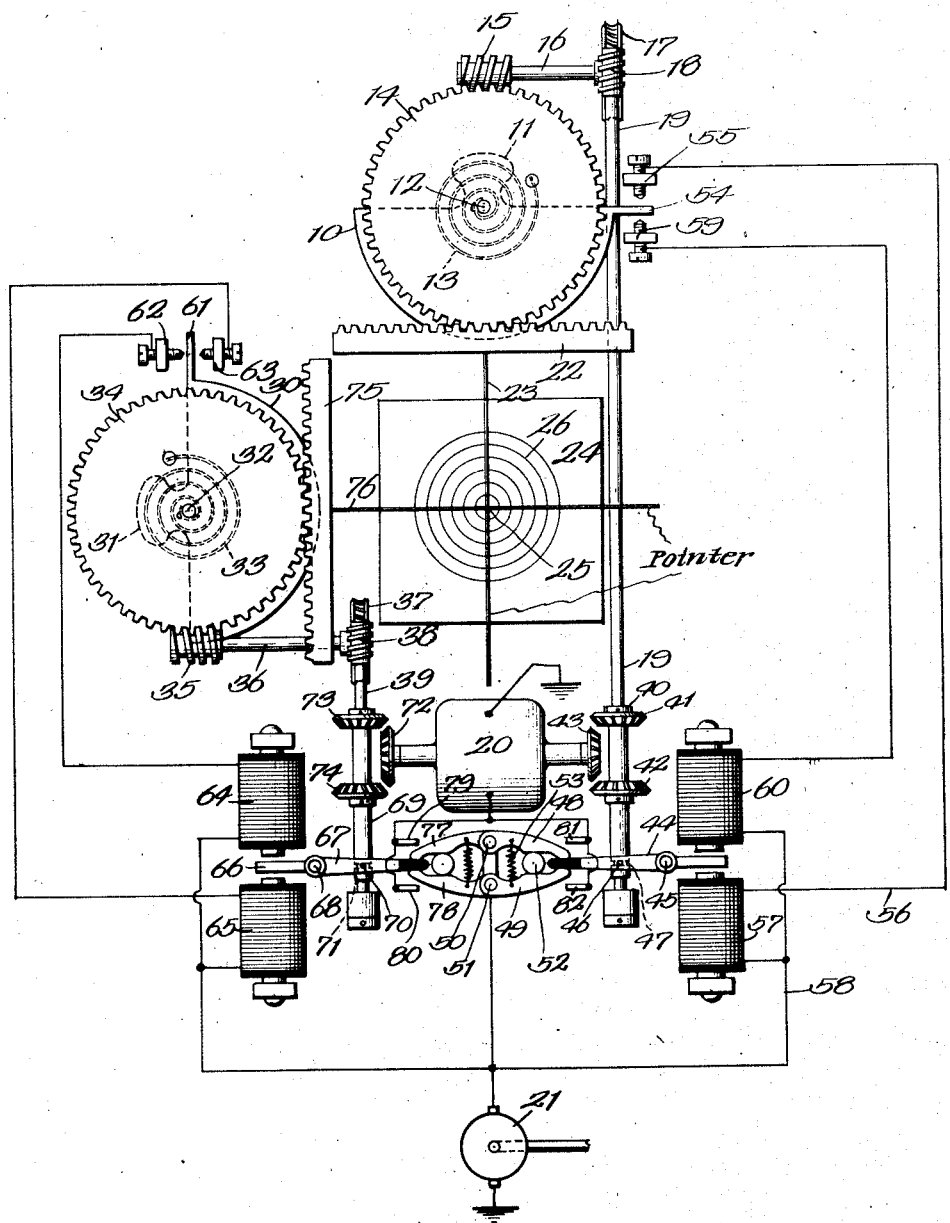
Inventor:
Arthur F. Poole

UNITED STATES PATENT OFFICE.

ARTHUR F. POOLE, OF KENILWORTH, ILLINOIS.

AEROPLANE SPEED-INDICATOR.

1,387,555.    Specification of Letters Patent.    Patented Aug. 16, 1921.

Application filed July 8, 1918. Serial No. 243,996.

*To all whom it may concern:*

Be it known that I, ARTHUR F. POOLE, a citizen of the United States, residing at Kenilworth, in the county of Cook and State of Illinois, have invented certain new and useful Improvements in Aeroplane Speed-Indicators, of which the following is a specification.

My invention is a speed indicator for aeroplanes and has for its object the giving of a simultaneous indication of the speed and direction of the aeroplane through the air.

My invention depends for its operation on the fact that the earth is surrounded by a magnetic field and that this field at any given time and place is constant in intensity and direction. If it is possible to place an indicator on the moving plane which will be affected by a motion through its magnetic field, one can then determine both the motion of the plane and the direction of this motion. It is well known that if a conducting body is moved through a magnetic field, eddy currents will be produced in said conducting body, and these currents, by reaction with the field which produce them, will cause a drag upon the conducting body proportional to the relative velocity between the field and the conducting body. I have taken advantage of this fact to provide an indicator which, as before noted, will give an indication of the direction and velocity of the motion of the aeroplane through the earth's magnetic field.

My present invention is in the nature of an improvement on the device disclosed in my copending application, filed May 31, 1918, Serial No. 237,585, and it is therefore necessary only to show my present invention in a diagrammatic form, since the principles underlying the basic invention are explained in detail in my copending application just referred to.

My invention will be best understood by reference to the accompanying figure, in which the apparatus necessary to carry out my invention is shown in diagrammatic form.

Mounted on the aeroplane is a light disk 10, which is in the form of a semi-circle having a projecting portion 11, which serves as a counterweight. The segment 10 is pivoted at 12, and has attached to it a spring 13, the other end of which is attached to a wheel 14 adapted to be driven by a worm 15, mounted on a shaft 16, upon which is mounted a gear 17, meshing in which is a worm 18, mounted on a shaft 19. I have provided an electric motor 20, which may be supplied from a suitable source of current, either in the way of storage batteries or a small generator 21 driven from the engine of the aeroplane. The gear 14 meshes in and drives a rack 22, which is held in its position by suitable guides, not shown. Attached to the rack 22 and moving with it is a light pointer 23, which is adapted to move over a graduated dial 24, having its center or zero point at 25, and being provided with concentric velocity circles 26 about the center 25.

I have also provided a second segment 30 similar to the segment 10, mounted on a pivot 32 and supplied with a counterweight 31. Attached to the pivot 32, which is rigid with the segment 30, is a spring 33, the other end of which is attached to a gear 34, similar to the gear 14 referred to above. The gear 34 is adapted to be driven by a worm 35, mounted on a shaft 36, having a spiral gear 37 mounted thereon. A rotatable shaft 39 has a spiral gear 38 mounted thereon, said gear being adapted to mesh with and drive the gear 37.

The entire apparatus, consisting of the segments 10 and 30 and their supports, is inclosed in a suitable casing (not shown) which is rotatably mounted in any convenient place in the plane. Since a swivel mounting for an observational instrument is well known in this art, I am not illustrating this mounting, but will assume that the apparatus diagrammatically shown in the drawings is mounted in a suitable case and that the case is rotatably mounted upon a bracket or pedestal attached to some convenient point of the plane. Before taking an observation the apparatus is rotated so that the diametral line of the segment 10 points east and west and the diametral line of the segment 30 points north and south. Obviously, the segment 10 will respond to an east and west motion only and will not respond to a north and south motion. Similarly, the segment 30 will be affected by a motion north and south through the earth's magnetic field and will not be affected by a motion east and west. By means hereinafter to be described, the segments 10 and 30 are held in approximately the same position with respect to the direction of the earth's magnetic field. Therefore the torque on the segment 10 will be the measure of the plane's velocity east and west and the torque on the segment 30 will be the measure of the plane's velocity north and south. The true velocity will be the resultant of these two motions and will be equal to the square root of the sum of their squares.

I shall now describe the mechanism by means of which the segment 10 is kept in an approximately constant angular position with respect to the earth's field. Slidably but non-rotatably mounted on the shaft 19 is a sleeve 40, upon which are rigidly mounted bevel gears or friction disks 41 and 42, either of which being adapted to engage and turn a beveled friction disk or gear 43, mounted on the shaft of the electric motor 20. The position of the collar 40 is controlled by the lever 44, pivoted at 45 and having an armature mounted thereon adapted to be actuated by either an electromagnet 57 or an electromagnet 60. The lever 44 is provided with a pin 46, which engages in a groove 47 in the sleeve 40 and serves to shift said sleeve and its attached gears 41 and 42 longitudinally on the shaft 19, according as the electromagnet 60 or the electromagnet 57 may be actuated. The lever 44 is held in an intermediate position by a pair of arms 48 and 49, pivoted at 50 and 51 respectively and held in contact with a post 52 by a spring 53. Obviously, if the magnet 57 is excited, the lever 44 will be rotated in a clockwise direction against the tension of the spring 53 and the gear 42 will be engaged with the gear 43. Again, if the electromagnet 60 is energized, the lever 44 will be turned about its pivot 45 in a counter-clockwise direction against the tension of the spring 53, and the gear 41 will be engaged with the gear 43. When the motor 20 starts to turn, the shaft 19 will be rotated in the reverse direction.

The motor 20 is governed by the arms 48 and 49, which have the double function of determining the normal position of the lever 44 and also providing switch contacts, by means of which the circuit of the motor 20 is closed. The arms 48 and 49, through their pivots 50 and 51, are connected to one side of the grounded generator 21. Coöperating switch contacts 81 and 82 are provided, these switch contacts being common to one side of the motor 20, the other side of which is grounded. Consequently, motion of the lever 44 in either direction will close the circuit of the motor 20, thereby starting the same in addition to engaging either the gear 41 or the gear 42 with the gear 43 mounted on the motor shaft. When the lever 44 is in its normal position, it is obvious that the circuit of the motor 20 will be broken and therefore the motor will be at rest.

In order to maintain the segment 10 in an approximately constant position, I have provided it with a contact point 54, which is adapted to contact with a point 55 connected by a wire 56 to an electromagnet 57, the other end of which is connected by a wire 58, to the ungrounded side of the generator 21. Therefore, if the speed of the plane east or west should decrease, the spring 13 would cause the points 54 and 55 to come in contact, with the result that the magnet 57 would be energized and the disk 42 would be brought into contact with the disk 43 and rotate the gear 14 in a clockwise direction. This rotation would persist until the spring 13 had been unwound to a point where its tension was less than the torque on the segment 10, in which event the points 54 and 55 would come out of contact, thus breaking the circuit through the magnet 57, and the spring 53 would return the arm 44 to its central position.

On the other hand, if the speed of the plane in an east and west direction should increase, the contact 54 would engage the contact 59, and the magnet 60 in circuit with the contact 59 would be energized, thus engaging the disk 41 with the disk 43, with the result that the gear 14 would be rotated in a counter-clockwise direction until the tension of the spring had increased enough to pull the points 54 and 59 out of contact with each other.

From the above description it will be seen that because of the velocity east and west being changed, the contact point 54 will contact with either the point 55 or 59, and such contact will, by shifting the collar 40 in the proper direction, change the tension of the spring 13 until said tension is again equal to the torque on the disk. Obviously the position of the gear 14 will be a measure of the torque on the segment 10. As before noted, the rack 22 and pointer 23 are geared to the gear 14. Thus the speed of the plane in an east and west direction will be measured by the displacement of the pointer 23 on either side of the center 25.

A similar control is provided for the segment 30, said control consisting of the contact 61 on the disk 30, said contact being adapted to move between contact points 62 and 63, thereby closing either the electromagnet 64 or the electromagnet 65. It is not necessary to trace out the circuit connections by which these magnets are closed, since they will be readily apparent from the figure. Energization of either the magnet 64 or the magnet 65 will move the armature 66, rigidly attached to a lever 67 pivoted at 68, from its normal position with the result that a sliding collar 69, similar to the collar 40, and having gears 73 and 74 rigidly mounted thereon, will be moved longitudinally on the shaft 39 by means of the pin 70 in the lever 67 engaging the groove 71 in the sliding collar 69. The lever 67 is provided with an end of insulating material and is held in its normal position by the scissors 77 and 78, pivoted at 50 and 51, and held in position by a spring similar to the spring 53, against a suitable banking post similar to the banking post 52. The scissor arms 77 and 78 are also connected to the ungrounded side of the generator 21 and serve by contact with the switch points 79 and 80 to start the motor 20.

The shaft 39 has on it a worm gear 38, which engages a similar worm 37 mounted on the shaft 36, which is provided with a worm 35, which engages the gear 34 by means of which the tension of the spring 33 is changed.

The gear 34 engages the rack 75, which is slidably mounted in the framework and has attached to it a light pointer 76. Obviously displacement of the pointer 76 from the center 25 will be a measure of the velocity of the plane in a north and south direction. As before noted, displacement of the pointer 23 will be a measure of the velocity of the plane in an east and west direction. Therefore, a line drawn from the intersection of these two pointers to the center 25 of the dial 24 will represent both in magnitude and direction the motion of the apparatus through the earth's magnetic field. As before noted, this motion will represent the true motion of the plane in reference to the earth.

For convenience in reading the velocity and direction of the plane as indicated by the displacement of the pointers 23 and 26, I have provided the dial 24 with a series of concentric circles. As noted in my prior application, the dial 24 will have to be calibrated according to the intensity of the horizontal component of the earth's magnetic field at the place where the apparatus is used. These dials may therefore be prepared beforehand, corresponding to different field intensities, and the dial having the field intensity corresponding to the place of observation may be used at the time the observation is made. This will avoid changing the calibration of the springs 11 and 33.

The invention described in the present application may be distinguished from that described in my copending application above referred to from the fact that in the apparatus of the present application all the power necessary to move the pointers is supplied by independent apparatus and does not depend upon deflection of the conducting disks themselves. All the work that the disks perform is the slight displacement of the contact poin's 61 and 54.

Referring to the action of the contact point 54 in maintaining the segment 10 in an approximately constant position, it may be noted that the fact of the contact point 54 coming in contact with the point 55 sets into action instrumentalities to move the gear 14 in a clockwise direction, which will change the tension of the spring 13 to separate the contacts 54 and 55.

Similarly, the fact of the contact 54 closing the circuit including the contact 59 sets into action instrumentalities to rotate the gear 14 in a counterclockwise direction, thus changing the tension of the spring 13 so as to separate the points 54 and 59. It is obvious that this result can be obtained in a variety of ways different from the precise structure which I have shown. Essentially the problem has already been solved in the case of recording volt and ammeters in which there is an element held in a constant position against a force to be measured by a spring. The fact of the force to be measured changing will set into action instrumentalities to change the tension of the spring until this tension is equal to the force to be measured. It will be noticed that this is essentially the problem to be solved in my improved speed indicator herein described.

A similar state of affairs exists in reference to the segment 30. The fact of the contact points 61 and 62 coming together will rotate the gear 34 in a clockwise direction, thus changing the tension of the spring 33 to separate these contacts. On the other hand, the fact of the contacts 61 and 63 coming together will set into action mechanism to rotate the gear 34 in a counter-clockwise direction, thus changing the tension of the spring 33 until it is equal to the force on the segment 30, thus separating the contacts 61 and 63, at which time further motion of the gear 34 will be stopped.

The normal position of the pointers 23 and 76 is with their points of intersection directly over the center 25 of the dial 24. This position is the position shown in the drawings. Either pointer may be moved into either of two directions, and therefore their point of intersection may be located in any one of four quadrants. The distance of this point of intersection from the center 25, as before explained, is the measure of the velocity of the plane, since this distance is the square root of the sum of the squares of the displacement of the pointers 76 and 23 from their zero position. The angle which the line drawn from the intersection of the pointers to the center 25 makes with the pointer 23 will of course give the true angle of direction of the plane's motion.

While I have not shown any means for damping the motion of the segments 10 and 30, it will be obvious to those skilled in the art how to provide a magnetic or air damping for each of these segments so as to prevent undue vibration.

In this specification I have shown and described the segments 10 and 30 as being pivoted. I have so described them for the sake of simplicity in the description. In practice I prefer to have the segments suspended in the middle of a fine piano wire which is placed under tension between two points of the framework. This wire then serves the purpose of both a support and a restoring spring 13 and has the advantage that the segments move with much less friction than if they are pivoted on shafts. A suitable form of this wire suspension is fully described in my copending application referred to above.

For the sake of clearness, I have shown the counterpoises 11 and 31 as being of the same material as their associated disks 10 and 30. However, I prefer to make these counterpoises of some material which is a non-conductor of electricity so that the effective torque on the disks 10 and 30 shall be confined to one side of their respective pivots 12 and 32.

While I have shown the motor 20 to be at rest, except during the time when any of the magnets 57, 60, 64 or 65 are energized, it will be obvious that the motor may be a constantly running motor, in which case the bevel gears 43 and 72 and their coöperating gears may be advantageously replaced by the beveled friction disks. In the event that a constantly running motor is employed, the motor starting mechanism consisting of the switch contacts 79, 80, 81 and 82 will be dispensed with.

Many variations and departures may be made from the precise structure herein shown without departing from the spirit of my invention, since I claim:

1. In a speed indicating apparatus, the combination of a movably mounted element adapted to be displaced from its normal position by motion through the earth's magnetic field, and automatic means to hold said element in an approximately constant angular position with respect to the earth's magnetic field.

2. In a speed indicating apparatus for aeroplanes, the combination of an aeroplane, a movably mounted element mounted thereon, said element being adapted to be displaced from its normal position by the motion of the aeroplane through the earth's magnetic field, and automatic means to hold said element in an approximately constant angular position with respect to the earth's magnetic field.

3. In a speed indicating apparatus for aeroplanes, the combination of an aeroplane, a movable element mounted thereon, said element being a conductor of electricity and adapted to be displaced from its normal position by the motion of the aeroplane through the earth's magnetic field, and automatic means to hold said element in an approximately constant angular position relative to the earth's magnetic field.

4. In a speed indicating apparatus for aeroplanes, the combination of an aeroplane, a movable element mounted thereon and adapted to be turned about a pivot against the force of a restoring spring by the motion of the aeroplane through the earth's magnetic field, and automatic means to change the tension of said restoring spring, due to variations in speed, and thereby maintain said movable element in an approximately constant angular position with respect to the earth's magnetic field.

5. In a speed indicating apparatus for aeroplanes, the combination of an aeroplane, a movable element mounted thereon, said movable element being a conductor of electricity and adapted to be turned about a center against the force of a restoring spring by the motion of the aeroplane through the earth's magnetic field, and automatic means to change the tension of said restoring spring due to variations in speed of said aeroplane and thereby retain said movable element in an approximately constant angular position with respect to the earth's magnetic field.

6. In a speed indicating apparatus for aeroplanes, the combination of a movable element rotatably mounted on said aeroplane, said element being a conductor of electricity and being adapted to be displaced from its normal position by the motion of the aeroplane through the earth's magnetic field, means tending to maintain said element in its normal position and automatic means to change the effective force of said maintaining means to thereby control the position of said movable element and other means governing the action of said maintaining means, whereby said movable element is held in an approximately normal position independent of the speed with which it is moved through the earth's magnetic field.

In witness whereof I have hereunto subscribed my name.

ARTHUR F. POOLE.